Dec. 29, 1931. H. J. NEUFANG 1,838,279
PLOW
Filed May 12, 1928 5 Sheets-Sheet 1

Fig.1

INVENTOR
Henry J. Neufang
BY
Cumpston & Griffith
his ATTORNEYS

Dec. 29, 1931. H. J. NEUFANG 1,838,279
PLOW
Filed May 12, 1928 5 Sheets-Sheet 2
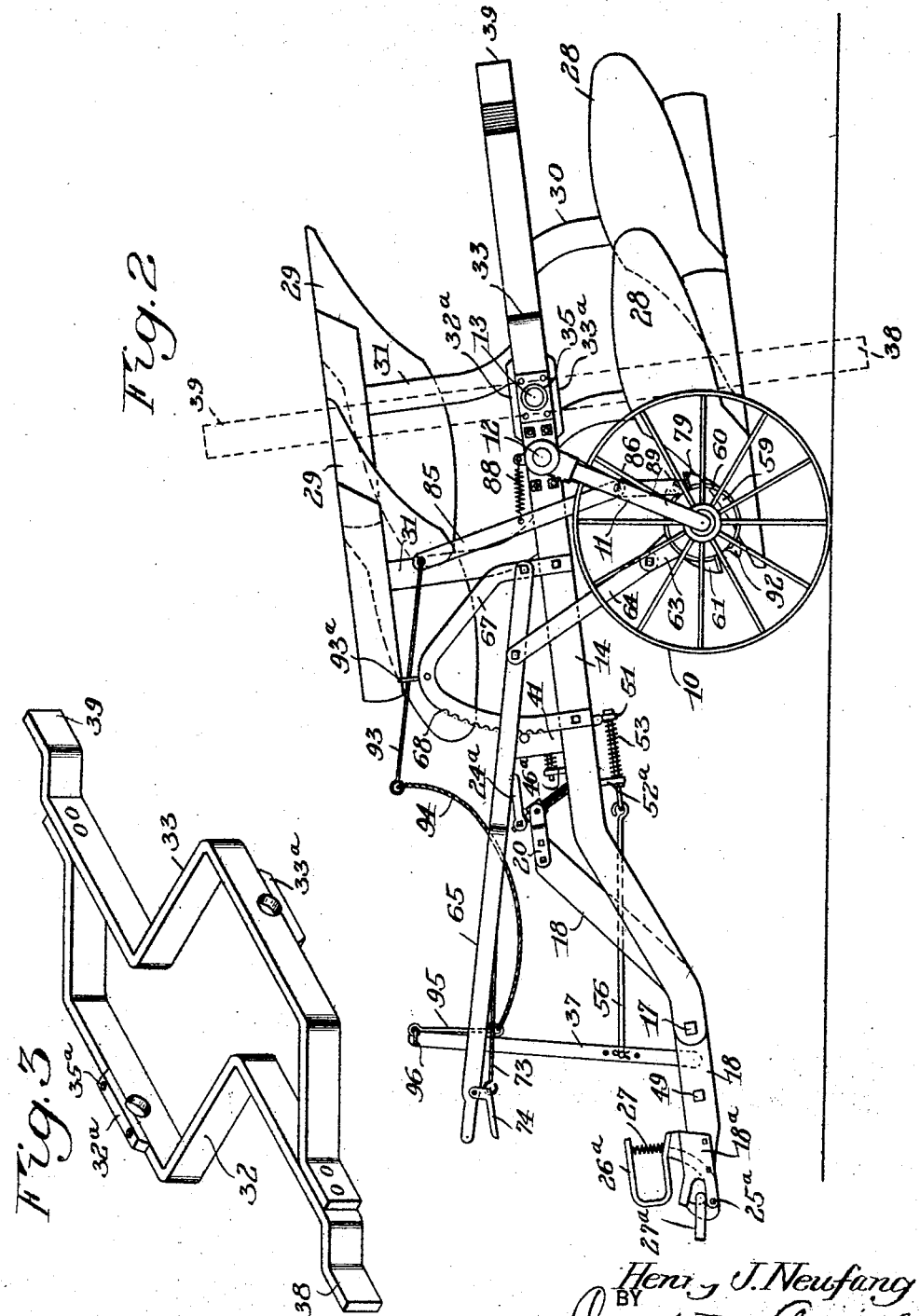
Henry J. Neufang
BY Cumpston & Griffith
his ATTORNEYS Dec. 29, 1931.  H. J. NEUFANG  1,838,279
PLOW
Filed May 12, 1928  5 Sheets-Sheet 3
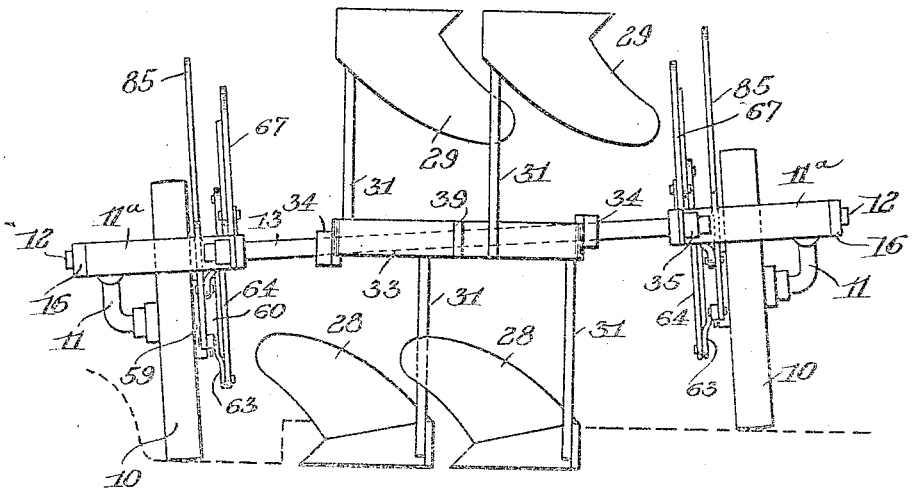
Fig. 4
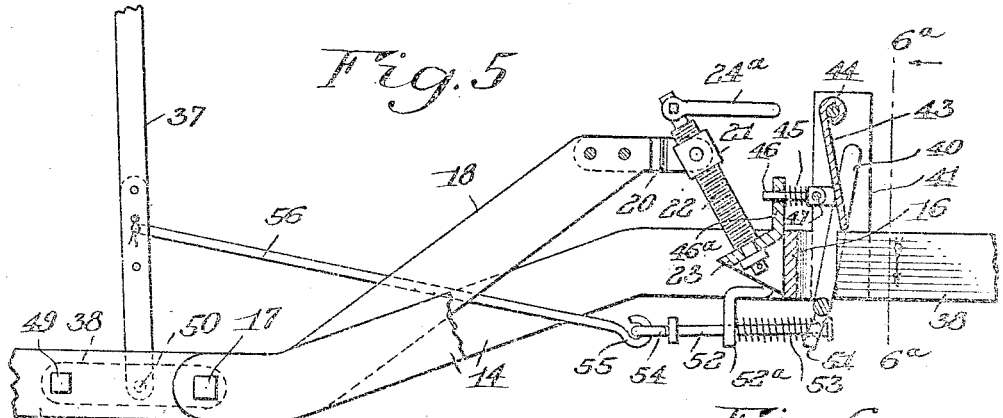
Fig. 5
Fig. 7
Fig. 6
INVENTOR
Henry J. Neufang
BY
his ATTORNEYS

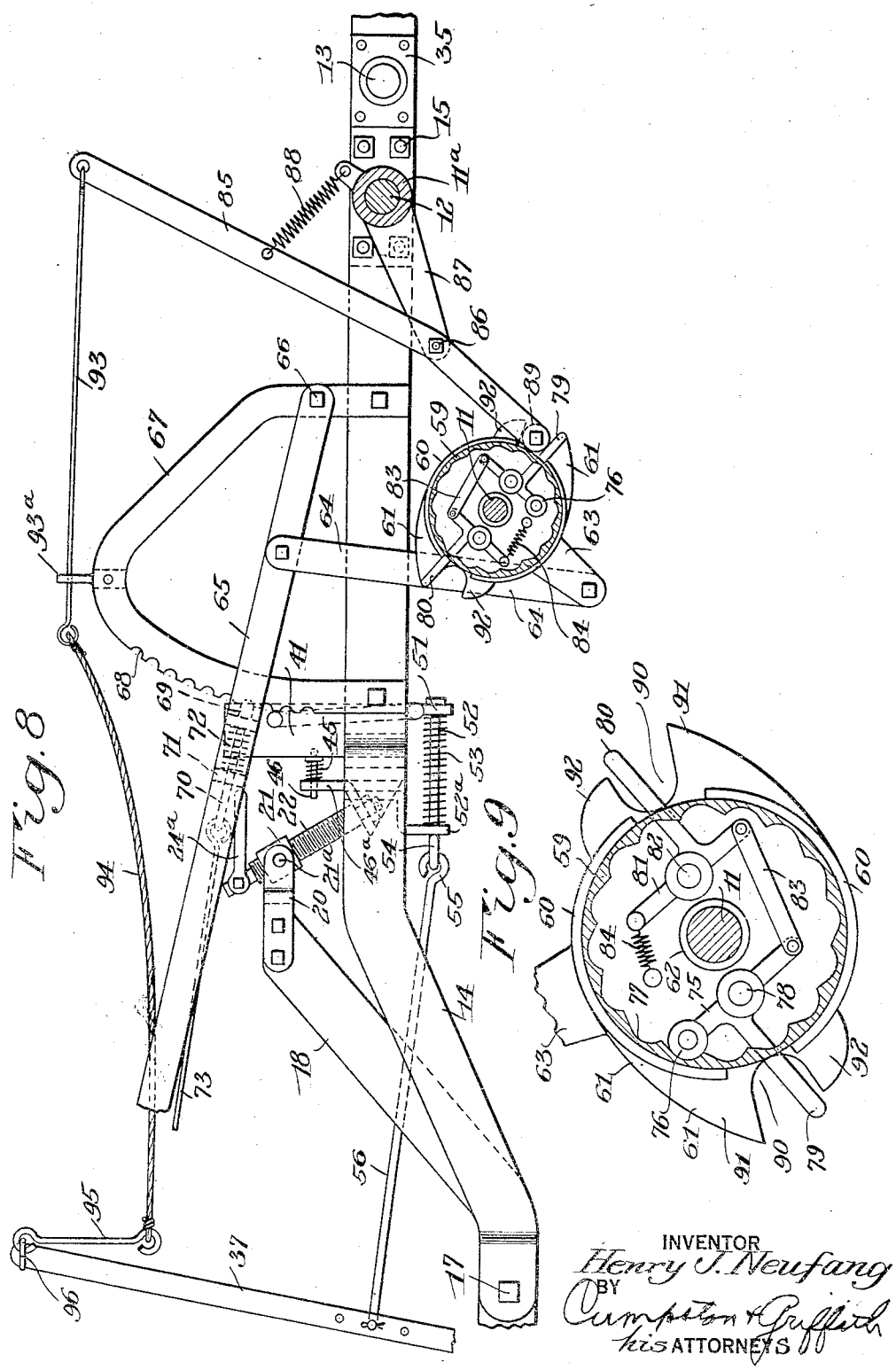

INVENTOR
Henry J. Neufang
BY
Crumpston & Griffith
his ATTORNEYS

Patented Dec. 29, 1931

1,838,279

UNITED STATES PATENT OFFICE

HENRY J. NEUFANG, OF ATLANTA, NEW YORK, ASSIGNOR, BY DIRECT AND MESNE ASSIGNMENTS, TO BOGGS PLOW COMPANY, INC., OF ATLANTA, NEW YORK, A CORPORATION OF NEW YORK

PLOW

Application filed May 12, 1928. Serial No. 277,365.

The present invention relates to plows and more particularly to reversible plows for right and left hand plowing and has for its object to provide an improved plow of this class which is of simple construction, convenient to control and efficient in operation.

A further object of the invention is to provide improvements in plows of this type relating more particularly to the mounting for the rotary or plow carrying frame, the means by which the plows are maintained on substantially an even keel when either of the wheels is operating in the furrow and also the means by which the plow frames are raised and lowered.

To these and other ends the invention resides in certain improvements and combinations of parts, all as will be hereinafter more fully described, the novel features being pointed out in the claims at the end of the specification.

In the drawings:

Fig. 1 is a top plan view, partly in section, of a plow embodying one form of the invention;

Fig. 2 is a side elevation of the same with the plow in raised position;

Fig. 3 is a perspective view of the rotary plow carrying frame shown in Fig. 1;

Fig. 4 is a rear elevation of the plow shown in Fig. 1 with the plowing implements lowered into operating position;

Fig. 5 is a fragmentary sectional elevation illustrating the latching means for holding the rotary plow frame in its different positions of adjustment;

Fig. 6 is a sectional elevation taken on line 6a—6a of Fig. 5;

Fig. 7 is a sectional plan taken on line 7a—7a of Fig. 1;

Fig. 8 is a fragmentary sectional elevation illustrating the clutch raising and draft beam adjusting mechanism;

Fig. 9 is a detailed sectional elevation through one of the wheel drums showing the clutch in operating position;

Similar reference numerals throughout the several views indicate the same parts.

Figure 10:
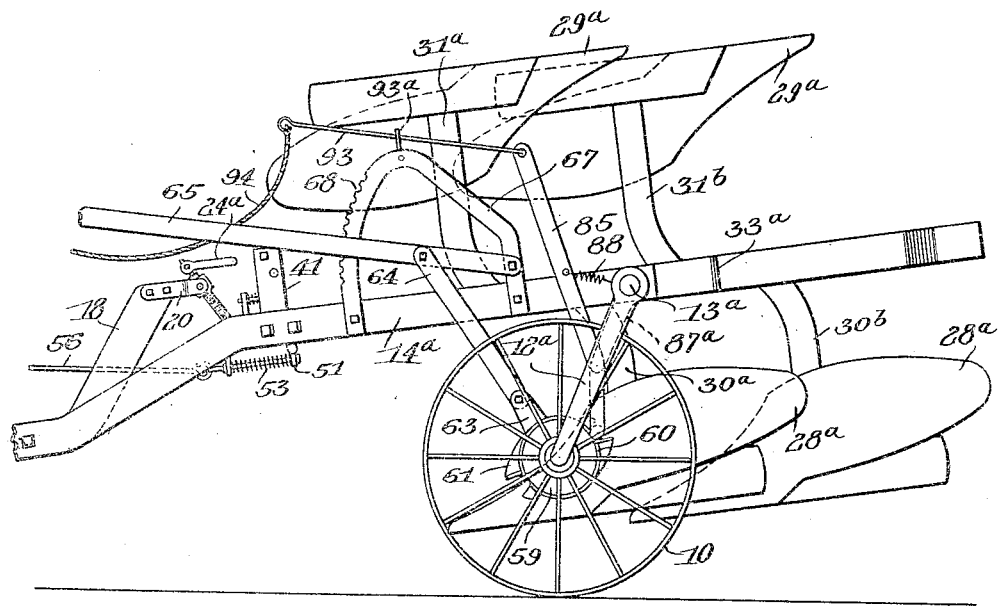
Fig. 10 is a side elevation of a plow in which one of the beams of each set of plows is made longer than the other for the purpose of maintaining the plows on substantially an even keel when either wheel is operating within the furrow and the other on unplowed ground.

The invention embodies an improved right and left hand plow of the type shown and described in my co-pending application, filed January 16, 1928, and bearing Serial Number, 247,003.

The improvements relate generally to the particular axle construction shown, the mounting of the rotary plow carrying frame independently of the axle, the improved manner of constructing and mounting the plows upon the rotary frame to maintain them on substantially an even keel with either wheel operating in the furrow and other features, as for example those relating to the raising and lowering means for the frame and the control devices therefor.

The invention embodies an improved right and left hand plow which may be drawn by a tractor or any other suitable power driven means. The machine comprises a pair of wheels 10 each having an axle comprising generally the arm and sleeve portions 11 and 11a respectively, bearings 12 being provided on which the sleeves are mounted to rotate. A transverse bar 13 is disposed at one side of the bearings 12, preferably in rear thereof as best shown in Fig. 1. The bar serves to connect the opposite sections 14 of the main frame which are also connected by a forwardly positioned transverse bar 15. The sleeve bearings 12 are provided with heads 12a preferably disposed on the inside of the frame members 14, being secured thereto by a suitable number of bolts 15a. Each sleeve 11a is held against outward displacement by a collar 16 secured by a pin 16a extending through the bearing member 12 as best shown in Fig. 7. The front ends of the frame sections 14 are convergently arranged and are connected by a bolt 17 on which is pivotally mounted intermediate its ends a draft beam 18.

The rear end of the draft beam is preferably offset upwardly and has secured thereon a pair of spaced arms 20. A block 21 is disposed between the arms and carries trunnions 21a journalled in the arms to permit the block to swing thereon. An adjusting screw 22 is threaded through the block and has its lower end rotatably supported by a bracket 23 secured on the transverse bar 16 by bolts 23a. The opening 24 in which the screw rotates is large enough to permit it to swing slightly to one side or another, so that it will more readily accommodate itself to the different positions of adjustment of the draft beam. The upper end of the screw is provided with an operating handle 24a which is pivoted to swing upon the screw to different operating positions. On the front end of the draft beam is disposed a coupling device indicated generally at 18a and by which the plow may be readily connected with a tractor or any suitable draft or pulling means. The coupling device embodies generally a lever 25 pivoted at 25a and having a tail portion 26 held by a pivoted latch 26a which in turn is held by a spring 27 adapted to yield under an excessive load on the lever to automatically release the same. A draft connection 27a engages the lever and is freed therefrom when the spring 27 yields to release the same. The draft connection constitutes a part of the tractor, not shown.

Adjustment of the screw serves to raise or lower the front end of the draft beam to adjust it for tractors having draft attachments at varying distances from the ground. Sufficient play is provided between the draft lever 25 and the connection 27a to permit the plow carrying frames to be swung from the lowered position shown in Fig. 4 to the elevated position shown in Fig. 2, whether or not the draft connection is of the flexible or rigid type. An additional advantage of the adjustable draft beam is that the adjusting screw may be rotated to effect adjustment of the main frame relative to the draft beam whereby to position the plows on an even keel regardless of the depth of furrow to be plowed or the height of the draft connection from the ground.

Two sets of plows, indicated generally at 28 and 29, are provided with short beams or standards 30 and 31 respectively having their inner ends bent and suitably secured to a rigid frame construction adapted to swing about a transverse axis afforded by the pivot member 13, said frame construction comprising the angular shaped bars 32 and 33 which are connected in any suitable manner and through which the pivot bar 13 is extended. The frame is held against lateral movement by suitable collars 34 rigidly secured on the pivot bar as shown in Fig. 3. The frame members 14 have their rear ends pivoted on the bar 13 and are held against lateral movement thereon by suitable collars or bearings 35 in which the opposite ends of the bar 13 are secured by pins 35a. The pins may be driven out to permit axial movement of the bar whereby it may be shifted until one end clears the side frame member 14 through which it projects. This end of the bar 13 may then be lowered and the bar, together with the rotary plow holding frame thereon shifted laterally to remove the bar and the frame as a unit from the main frame. There are several advantages in mounting the rotary plow carrying frame to swing about an axis at one side of the points of connection of the axles 11—11a with the main frame. In the first place, this arrangement permits the bar 13 and the rotary plow carrying frame thereon to be constructed as a unit and to be applied to and removed from the main frame as such, either with the wheels connected thereto or disconnected therefrom.

In the second place each wheel and its axle may be readily removed from the main frame as a unit by driving out the pin 16a and slipping off the sleeve 11a without removing or disturbing the pivot bearings 12, which are fixed to the side frame members 14. The frame bars 32 and 33 are provided with extended end portions 38 and 39 respectively for engaging the ground during the swinging operations from one position of adjustment to another while the plow is advancing. The plow points and mold-boards of the two sets of plows also serve to assist in causing the plow holding frame to rotate upon its axis through successive engagement with the ground, following the initial swinging movement produced by one or the other of said ends swinging to ground engaging position while the plow is advancing.

The bar 32 of the plow carrying frame is provided at one side with a removable bearing portion 32a and the opposite bar 33 is provided at one side with a removable bearing portion 33a. These portions serve to increase the depth of the bars at the bearing points of the pivot bar 13 to provide sufficient material to permit one of the bearings for said bar to be offset upwardly and the other downwardly so that the pivot bar will be inclined to the horizontal, which is necessary since one of the wheels of the plow operates within while the other travels without the furrow. By thus offsetting the bearings for the pivot bar or drilling the holes for the same at the proper inclination to take care of the difference in the operating positions of the wheels, the plow carrying frame, in either position to which it is swung will remain substantially horizontal. Thus the plows will be maintained on an even keel regardless of the fact that one wheel operates within the furrow while the other operates on unplowed ground as shown in Fig. 4.

The revoluble frame is normally held during operation of the plows in the position shown in Fig. 1 by the holding means shown in Figs. 5 and 6. This means preferably comprises a yoke-shaped member 40 disposed between and pivotally supported by a pair of angularly shaped bracket members 41 having their lower ends bent and rigidly secured upon the transverse frame bar 15 by bolts 42. The revoluble frame is prevented from swinging upwardly by a latch member 43 pivoted at 44 between the bracket members 41 and is held in latching position as shown in Fig. 5 by a spring 45 on a stem 46, the rear end of which is pivotally connected with the latch at 47 while its front end is slidably supported by an upstanding portion 46a of the bracket 23. The spring 45 is adapted to urge the latch 43 to the position shown in Fig. 6, the latch being automatically displaced by the ends 38 and 39 of the frame when moving downwardly into engagement therewith, but being automatically returned by the spring 45 when said ends reach their lowest position in the yoke 40.

Release of the frame for a rotating movement is effected by moving the yoke 40 to the position shown in Fig. 5 which is accomplished through the medium of a lever 37 forked at its lower end and arranged to straddle a support 38, one end of which is secured by the pivot bolt 17 of the draft beam and the other by a bolt 49 connected with the draft beam. The lever is pivotally connected with the member 38 by a bolt 50, Fig. 1. The yoke 40 is provided with a crank arm 51 actuated by a rod 52 slidably disposed in a bracket 52a and is automatically returned by a spring 53 when the lever 37 is released. The rod 52 is provided with a looped head 54 linked with a corresponding head 55 on a forwardly extending connection 56 having pivotal engagement with the lever 37 intermediate its ends. The bracket 52a is secured upon one end of bracket 23 by one of the bolts 23a thereof.

The mechanism for regulating the depth at which the plows are adapted to operate and for raising the frame upon which the plows are mounted include cooperating parts for effecting both movements as will hereinafter appear.

The raising of the frame at the end of each furrow to a position at which it can be readily swung upon its transverse axis or about the shaft 13 is effected by means of a suitable clutch on each wheel such as that illustrated in Figs. 8 and 9, these views showing one clutch respectively in normal release and coupled positions. Upon advancement of the wheels with the clutches in coupled position the main frame including the shaft or pivot bar 13 will be elevated as indicated in Fig. 2, the yoke 40 being moved to release position to permit the front end of the plow carrying frame to swing downwardly into engagement with the ground. Upon further advancement of the plow the frame, by reason of its contact with the ground will be swung through an angle of approximately 90° to substantially horizontal position, being limited in its movement by the yoke 40 when it reaches the position shown in Fig. 5. As either end 38 or 39 approaches this position it automatically moves the latch 43 forwardly, the latter being returned to locking position by the spring 45 as soon as said end is moved to its lowest position within the yoke. These adjustments are effected at the end of the furrow and when completed the plows are lowered ready for the plowing of the next succeeding furrow. The dotted line position of the plow carrying frame indicated in Fig. 2 shows the position of the same after it has rotated through an angle of approximately 90° as a result of the action of gravity in pulling it down and the swinging movement given it through contact with the ground.

As both clutches are of the same design a description of one will suffice for the other. The clutch on the wheel 10 embodies a drum 59 rigidly connected with the wheel and normally rotates within the arcuate portions 60 of a casing 61 having a sleeve 62 journalled on the inner end of the axle 11 and held against longitudinal movement upon the axle by any suitable means not shown. The casing 61 carries an arm 63 pivotally connected with a link 64 which in turn is pivotally connected with an operating lever 65. The lever is pivoted at 66 to an upstanding support 67, preferably comprising an inverted U-shaped frame member, the lower ends of which are suitably connected with the forwardly extending frame 14 as shown in Fig. 8. The forward leg of the U-shaped frame member is provided with a series of notches 68 adapted to receive a pawl 69 on a stem 70 slidably mounted in a lug 71 on the lever 65, the stem carrying a spring 72 for moving the pawl to locking position when released. An operating rod 73 for releasing the pawl 69 is connected at its inner end with the stem 70 and at its outer end with a hand grip lever 74 of any preferred type. It will be understood, of course, that the mechanism just described is in duplicate at opposite sides of the main frame, one for each clutch and that both levers 65 have their forward end conveniently located for operation by the driver of the tractor.

The casing 61 is coupled with the drum 59 when desired by a lever 75 having a roller 76 adapted to take into notches 77 of the drum as shown in Fig. 9. The lever 75 is pivoted to the casing at 78 and is provided with an operating extension 79 similar to an extension 80 on a control lever 81 which is pivoted to said casing at 82 and operatively connected with the lever 75 by a link 83. A spring 84 is adapted to move the lever 75 to a clutching position as shown in Fig. 9 when the lever arm 80 is disengaged from a control lever 85 pivoted at 86 to an arm 87 rigid on the sleeve 11a and paralleling the arm 11 of the axle. The control lever 85 is held in the locking position shown in Fig. 8 by a spring 88 and carries at its lower end a roller 89 for normally engaging either of the lever arms 79 and 80, whereby to render the clutch inoperative. The levers 85 not only serve to control the clutch mechanisms but cooperate with the arms 87 on the axle sleeves 11a to afford supporting elements for the main frame in addition to the supporting parts 64 between the clutches and main frame. In the normal position of the lever 85 the roller 89 is within one of the notches 90 formed by the relatively long and short lugs 91 and 92 respectively which are projected from the casing 60 as shown in Fig. 9. The control lever 85 is adapted to be moved to release position by a flexible member 93 held by a guide 93a on the ratchet bar 67, the rod having an operating cable 94 connected with a link 95 depending from an eye bolt 96 secured to the upper end of the lever 37. It will be further understood that both clutch releasing levers 85 are provided with similar operating members 93 and 94, both of the latter being connected at their forward ends with the operating link 95. With this arrangement the clutches may be separately or simultaneously released as desired, by pulling on one only or both at the same time. Upon release of the clutch levers 85 when the plows are in operating position the springs 84 will move levers 81, links 83 and levers 75 to position the rollers 76 in one of the notches 77 of each drum 59, whereby to couple the wheels 10 and 10 with the casings 60, so as to rotate both of the latter, thus moving the arms 63 in a counter clockwise direction as viewed in Fig. 8. This serves, through the medium of the links 64, levers 65 and frame members 67 to raise the main frame to the position shown in Fig. 2. During such raising movement the rollers will ride upon the cams 91 and will automatically drop into the notches 90 and engage one or the other of the lever arms 79 and 80 of each clutch to disconnect it as shown in Fig. 8.

To effect lowering of the pivoted plow carrying frame, the levers 85 must be again released, whereby the clutches will again be rendered effective to rotate the casings 61 and arms 63 from the position shown in Fig. 2 back to that shown in Fig. 8, the links 64 during such movement serving to pull the main frame down and permitting the plows to enter the ground ready for plowing the next succeeding furrow.

The depth at which the plows are to be operated can easily be regulated by raising or lowering the levers 65 as desired.

In releasing the clutches to permit wheels to raise the plow carrying frame, it is, of course, necessary to exert a pull on the cables 94 which can be readily done by gripping the link 95 and swinging its lower end forwardly of the lever 37. It will be understood, however, that in moving the yoke 40 to the release position shown in Fig. 5 it is necessary to exert a forward pull on the upper end of the lever 37 and this operation can readily be performed by exerting a forward pull on the link 95. When it is desired to effect release of the clutches and the frame holding means the operator will grip the link and by moving it forwardly he can readily effect release of the clutch and the frame holding means at one operation, either moving one slightly in advance of the other or both simultaneously.

With the relatively adjustable draft beam and frame construction shown, it is comparatively easy to vary the height of the line of draft in order to vary the depth at which the plows are required to operate under different conditions encountered from time to time, such as a difference in the character of the soil or a variation in the depth of plowing for different crops to be planted. The depth of the furrow will, of course, be regulated by adjustment of the hand lever 65 to vary the height of the frame from the ground, it being understood, however, that the height of the line of draft is dependent to a certain extent on the depth of the furrow to be plowed. It will be further understood that the plows must be kept on a substantially even keel for the various depths at which they operate. It is, therefore, necessary when changing or fixing the height of the line of draft by positioning the front end of the draft beam at the required distance from the ground to level up the plow supporting frame in order to insure operation of the plows on an even keel. This, of course, requires relative movement between the draft beam and the frame which is readily and easily effected by turning the handle 24a of the adjusting screw 22. With this means a quick and relatively fine adjustment can be effected in leveling up the frame to place the plows on an even keel for effective operation at the depth determined upon.

Figure 11:
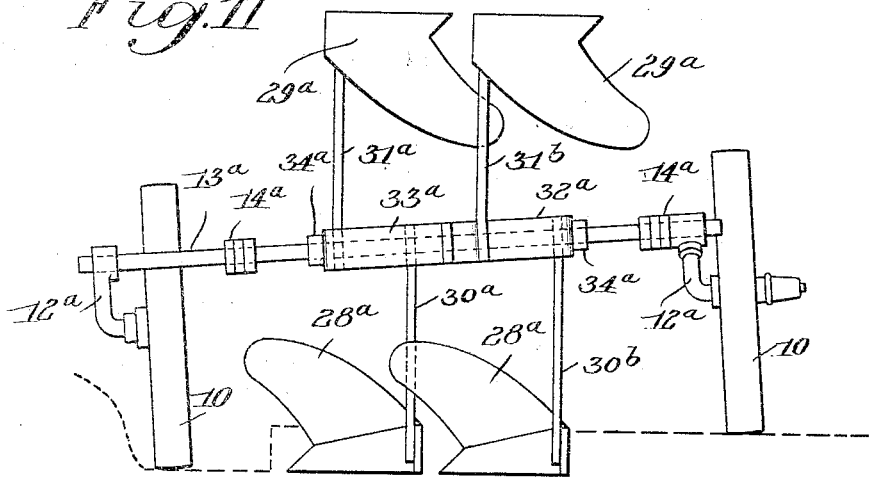
Fig. 11 is a rear elevation of the same with the plows shown in operating position.

In the modification shown in Figs. 10 and 11, the construction is the same as that shown in the remaining figures except that the rotary plow carrying frame is mounted on a transverse bar 13a which forms, with the arms 12a, a crank axle for supporting the main frame 14a and the rotary plow carrying frame which is arranged to swing through a circle about the axis of the transverse bar 13a in the same manner as described above in connection with Figs. 1 to 9 inclusive. The remaining portions of the plow indicated in Figs. 10 and 11, except as pointed out hereinafter, are the same as in Figs. 1 to 9 and are, therefore, given the same reference characters. In this modification only one lever mechanism for manually raising the frame and one clutch is shown, as in my co-pending application referred to above, where with the same type of crank axle a single clutch is sufficient to effect raising and lowering of the main frame.

Furthermore, the offset bearings shown in Fig. 3 are not required for the reason that I obtain the same result afforded by this arrangement by lengthening one beam of each set of plows so that with either wheel operating in the furrow the plows of each set will remain on substantially an even keel as shown in Fig. 11. For example, of the plow beams 30a and 30b the latter is made longer than the former as indicated in Fig. 11 and likewise the beam 31a is made longer than the beam 31b so that when the right hand wheel shown in Fig. 11 is in the furrow the plows 29a will operate on substantially an even keel as do the plows 28a when the plows are in the position shown in this figure. This arrangement requires a slight bending of the beams adjacent their points of attachment to the rotary frame members 32a and 33a, with which they are connected. These beams are connected with the frame members 32a and 33a preferably by a suitable number of bolts as shown in Fig. 1. The rotary frame is held against lateral movement on the transverse bar 13a by the collars 34a at opposite sides thereof.

The opposite ends of the plow carrying frame 32a—33a engage the ground to effect turning of the plows during advancement of the machine in the same manner as described above and are held by the same locking means shown in Figs. 5 and 6.

With the frames in raised position and the wheels on substantially level ground the plows carried by the longer beams will project above and below the bottoms of the plows on the shorter beams as indicated in Fig. 10.

If preferred, the rotary plow carrying frame 32a—33a, which is not provided with the offset bearings, may be mounted for rotation on the transverse bar 13 to take the place of the frame shown thereon in Fig. 1. In other words, the rotary plow carrying frame with the long and short plow beams will operate in the same manner as the frame 32—33 if placed on the transverse bar 13 shown in Fig. 1.

I claim as my invention:

1. A plow comprising in combination, a pair of wheels, a main frame supported by the wheels, a rotary frame supported by the main frame for rotation in one direction through a circle about a transverse axis to different positions of adjustment, separate sets of right and left hand plows having supporting beams mounted on opposite sides of said rotary frame, one beam of each set being longer than another whereby with either wheel operating in the furrow the plows adjusted to plowing position will operate on substantially an even keel, and releasable means upon the main frame for supporting the rotary frame in its different positions of adjustment.

2. A plow comprising in combination, a pair of wheels, a main frame supported by the wheels for vertical movement upon the latter, a rotary frame supported by the main frame for rotation in one direction through a circle about a transverse axis to different positions of adjustment, separate sets of right and left hand plows on opposite sides of said rotary frame, means carried by said rotary frame for supporting the plows of each set one at a greater distance from the rotary frame than the other whereby with either wheel operating in the furrow the plows adjusted to plowing position will operate on substantially an even keel, holding means for supporting the rotary frame in different positions of adjustment, and means for raising and lowering the main frame.

3. A plow comprising in combination, a pair of wheels, a main frame supported by the wheels, said wheels and frame being arranged for relative vertical movement, a rotary frame supported by the main frame for rotation in one direction through a circle about a transverse axis to different positions of adjustment, separate sets of right and left hand plows on opposite sides of said rotary frame, means carried by said rotary frame for supporting the plows of each set one at a greater distance from the rotary frame than the other whereby with either wheel operating in the furrow the plows adjusted to plowing position will operate on substantially an even keel, holding means for supporting the rotary frame in different positions of adjustment, a draft beam adjustably connected with the main frame, separate raising devices for varying the height of the main frame arranged upon release to be actuated by the travel of the plow and manually controlled means for releasing said devices.

4. A plow comprising in combination, a pair of wheels, a main frame supported by the wheels, a rotary frame supported by the main frame for rotation in one direction through a circle about a transverse axis to different positions of adjustment, said rotary frame having spaced end portions for alternate engagement with the ground during the travel of said frame through the circle while the machine is advancing whereby to effect completion of the swinging movements of the rotary frame to its different positions of adjustment, means upon the main frame for holding said rotary frame in said positions of adjustment, separate sets of right and left hand plows on opposite sides of said rotary frame, and means carried by the latter for supporting the plows of each set one at a greater distance from the rotary frame than another whereby with either wheel operating in the furrow the plows adjusted to plowing position will operate on substantially an even keel.

5. A plow comprising in combination, a pair of wheels, a main frame disposed between said wheels, bearing members secured upon and projecting laterally from the main frame beyond the wheels, an axle interposed between each wheel and the bearing member nearest thereto comprising an arm at the outer side of the wheel and a sleeve connected therewith and mounted to rotate upon the bearing member, adjustable means interposed between the wheel and main frame for supporting the latter, a second frame mounted to rotate upon the main frame in one direction about a transverse axis through a circle to different positions of adjustment, right and left hand plows carried on opposite sides of the second frame for alternate engagement with the ground, and means upon the main frame for holding the second frame in its different positions of adjustment.

6. A plow comprising in combination a pair of wheels, a frame, separate axles connecting said frame with the wheels each movable relative to the frame to effect vertical movement of the latter, separate raising devices for the opposite sides of the frame arranged upon release to be automatically coupled with the wheels for operation thereby, oppositely arranged plowing implements mounted upon the frame for rotation between the axles in one direction through a circle adapted for alternate engagement with the ground, holding means on the frame for said implements, release means for said holding means including a manually operable part and means arranged to be operated by said part for effecting simultaneous release of said raising devices.

7. A plow comprising in combination, a pair of wheels, a frame, separate axles connecting said frame with the wheels movable to vary the vertical position of the frame, separate operating devices arranged upon release to be actuated by the travel of the machine to effect raising of the frame, oppositely arranged plowing implements supported by the frame for rotation between and independently of the axles in one direction through a circle adapted for alternate engagement with the ground, holding means on the frame for said implements, release means for said holding means including a manually operable element, and release means for said operating devices including parts associated with said element and arranged to be actuated thereby when said element is moved to release said holding means.

8. A plow comprising in combination, a pair of wheels, a frame, supporting connections between the frame and the wheels, each movable relative to the frame and one independently of another, releasable operating devices for said connections arranged upon release to be actuated by the travel of the plow, a second frame movable to different operating positions upon the first mentioned frame between and independently of the connections, a plowing implement carried by the second mentioned frame for operation in each of said positions, releasable holding means for the second frame, and manually operable associated devices arranged to effect independent release of said operating devices and said holding means, one of said associated devices being operable to actuate another.

9. In a plow, the combination of supporting wheels, a main frame having spaced side members disposed adjacent the wheels, separate axles on which the wheels are journaled, said axles being pivotally connected with the side frame members whereby the latter are free to swing relative to the axles and the wheels, a rotary frame provided with right and left hand plowing implements supported by and between said frame members and axles for rotation independently of the axles about an axis transverse to the line of travel of the plow to move said implements progressively in the same direction by contact with the ground to successively position the implements for plowing, releasable holding means connected with the side frame members for supporting the rotary frame in its different positions, separate raising devices for the side frame members arranged upon release to be actuated by the travel of the plow to elevate said frame members while maintaining the wheels in contact with the ground, a manually operable device on said main frame, means connected with said device for releasing said holding means, and a releasing element for each of said raising devices associated with said manually operable device arranged for operation independently thereof and for joint operation therewith at the same time to effect substantially simultaneous release of said holding and raising devices.

10. In a plow, the combination of supporting wheels, a main frame having side members provided with laterally extending bearings, separate axles interposed between said wheels and bearings, a second frame provided with a plurality of plowing implements mounted between said side members and independently of the axles for rotation about a transverse axis through a circle progressively in the same direction and by contact with the ground to move said implements successively into different operating positions, releasable holding means on the main frame for said second frame, separate raising devices interposed between the wheels and axles for raising said main and rotary frames, relatively movable supporting elements for the main frame interposed between each axle and the corresponding raising device, one of said elements being releasable to permit the main frame to move from a raised to a lowered position, an operating device for releasing said holding means, and control means associated with said operating device for effecting simultaneous movement of said release elements to release position, said control means being operable independently of said operating device and jointly therewith by the use of one hand.

11. In a plow, the combination of supporting wheels, a frame having spaced side members located inwardly of the wheels, bearings extending outwardly from the frame members, separate axles for the wheels extending outwardly therefrom and having sleeve-like portions arranged to rotate upon said bearings, right and left hand plowing implements supported between said side members and axles and independently of the axles arranged for rotation about a transverse axis through a circle progressively in the same direction by contact with the ground, releasable holding means for the plowing implements connected with said frame, means for releasing said holding means, raising devices arranged to be actuated by the travel of the plow whereby to elevate the frame and implements while maintaining the wheels in contact with the ground, and control means for said raising devices including parts pivotally connected with said sleeve portions.

12. In a plow, the combination of supporting wheels, a main frame having side members disposed inwardly of the wheels and connected by front and rear transverse members, bearings extending outwardly from the side members, separate axles for the wheels having arms disposed outwardly thereof and provided with sleeves free to rotate on said bearings, a second frame including right and left hand plowing implements supported between the side members and independently of the axles for rotation upon said rear transverse member through a circle progressively in the same direction by contact with the ground, releasable holding means for the second frame connected with said front transverse member, means for releasing said holding means, raising devices interposed between the wheels and the main frame arranged to be actuated by the travel of the wheels whereby to elevate said main and second frames, arms extending laterally from said sleeves, levers for controlling said raising devices pivotally connected with said arms and cooperating with the raising devices to support said frames in elevated position, and means for releasing the levers to permit said frames to be lowered.

HENRY J. NEUFANG.